(12) United States Patent
Behrens et al.

(10) Patent No.: US 7,750,494 B1
(45) Date of Patent: *Jul. 6, 2010

(54) SYSTEMS AND VESSELS FOR PRODUCING HYDROCARBONS AND/OR WATER, AND METHODS FOR SAME

(75) Inventors: Rudolph Behrens, 254 Liberty Ct., Collegeville, PA (US) 19426; Todd Behrens, Collegeville, PA (US); Courtney Behrens, Collegeville, PA (US); Derek Behrens, Collegeville, PA (US)

(73) Assignee: Rudolph Behrens, Collegeville, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/998,912

(22) Filed: Dec. 3, 2007

Related U.S. Application Data

(60) Provisional application No. 60/874,504, filed on Dec. 13, 2006.

(51) Int. Cl.
*F03D 9/00* (2006.01)
(52) U.S. Cl. .......................... 290/55; 114/264
(58) Field of Classification Search ............ 114/264, 114/265; 290/55
See application file for complete search history.

(56) References Cited

U.S. PATENT DOCUMENTS

| | | | |
|---|---|---|---|
| 6,254,734 B1 * | 7/2001 | Sephton | 203/2 |
| 2004/0013923 A1 * | 1/2004 | Molter et al. | 429/25 |

* cited by examiner

*Primary Examiner*—Stephen Avila
(74) *Attorney, Agent, or Firm*—John F. A. Earley, III; Frank J. Bonini, Jr.; Harding, Earley, Follmer & Frailey

(57) ABSTRACT

Systems and methods for producing hydrocarbons from wind energy, water, and air comprising a power system, wind turbine, and electrical generator; the system further comprises a water purifier comprising a conduit and vacuum device for flash distillation; the system further includes a hydrocarbon processor, which comprises a carbon dioxide interface, and electrolyzer, a reverse water gas shift reactor, and an ethanation reactor; alternatively the hydrocarbon processor may include a cyanobacteria cultivator a solution optimizer and a catalyzer; also included is a method for producing purified water using vegetation in a floatable craft; also disclosed is a synthetic fuel process consisting of a translucent closed tank for producing algae and a protein separator for dewatering algae; methods relating to production and drawing of algae to produce methane and other hydrocarbon promoters; also disclosed is a energy producing rainkine-cycle engine device for storing concentrated solar energy.

29 Claims, 12 Drawing Sheets

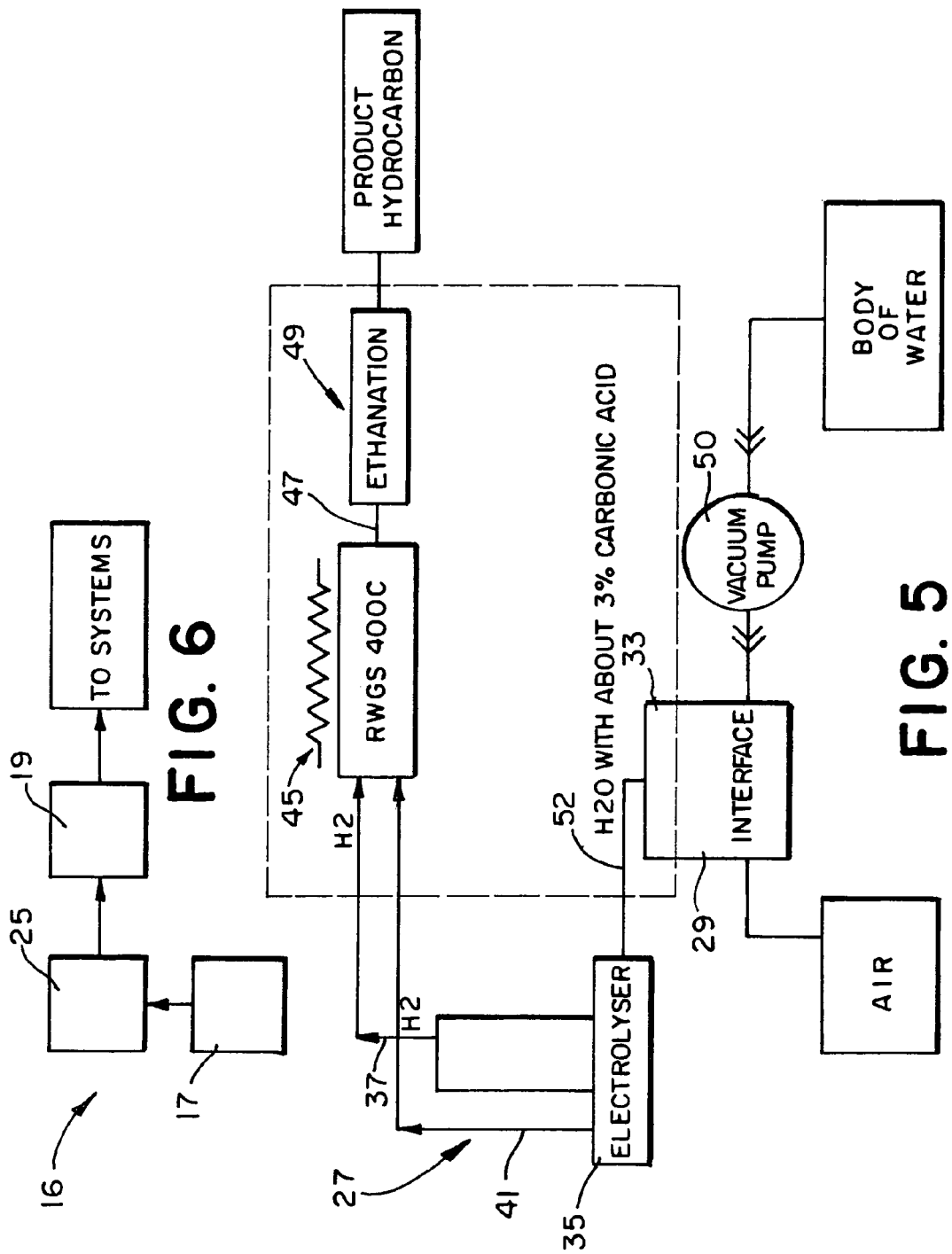

US 7,750,494 B1

SYSTEMS AND VESSELS FOR PRODUCING HYDROCARBONS AND/OR WATER, AND METHODS FOR SAME

CROSS REFERENCE TO RELATED APPLICATIONS

This application claims the benefit under 35 U.S.C. Section 119(e) of prior filed provisional application No. 60/874,504 filed on Dec. 13, 2006; and this application claims the benefit under 35 U.S.C. Section 120 of prior filed non-provisional application Ser. No. 11/189,430 filed on Jul. 25, 2005, which issued as U.S. Pat. No. 7,302,903 on Dec. 4, 2007, and which claims the benefit under 35 USC Section 119(e) of prior filed provisional application No. 60/590,731 filed Jul. 23, 2004.

BACKGROUND OF INVENTION

1. Field of the Invention

The present invention relates to the production of hydrocarbons and/or purified water, and more particularly concerns the production of hydrocarbons and/or purified water using air, water and wind energy as raw materials. This invention also relates to producing water utilizing trees and plantlife.

2. Brief Description of Prior Art

There is an ongoing erosion of energy generating capacity in North America, especially with respect to base load generating facilities. Base load energy is the least costly energy to produce by power companies. Because of environmental and industry regulation and significant market changes, utilities foresee that base load energy production will not keep pace with demand, therefore requiring the generation of additional energy using other more costly means. This is especially troublesome because base-load energy plants are usually the most costly and time consuming to construct, traditionally being coal, nuclear, heavy oil or hydro-electric plants. Some new combined cycle plants have slightly shorter construction time, but they are still costly to build and are dependant on natural gas or light oil, both fuels with a volatile price history.

The electric utility companies could increase their base-load energy capacity by 30 percent overnight if they use their peak load combustion turbines for base load power. Presently this is not possible because these turbines are simple-cycle gas turbines with a maximum thermal-dynamic efficiency of 25 percent. Additionally, they can only be run for a limited number of hours a day since they do not conform to air pollution standards. Because of these factors, they cannot be run profitably and are used only to make up for small, short term power short falls, as might occur during the morning and evening peak demand times. To operate these plants for base load profitability, in an environmentally clean manner, power producers would require a fuel that does not cause noxious emissions and sells at an economically feasible price. Several fuels possess one or the other of these desired traits, but none possesses both traits.

There is an ongoing increase in need for potable water supply throughout the world, especially in high population density areas. Use of the ocean water as the source water for potable water has been prohibitive due to the costs of treatment. Accordingly, it would be desirable to use the ocean water as a source to provide potable drinking water without expending large amounts of non renewable energy.

SUMMARY OF THE INVENTION

It is an object of this invention to provide a system, or unmanned self-propelled robotic vessel that converts wind energy into ethanol or other hydrocarbons by processing sea water and air. The system can be land based or affixed to a platform exiting over a body of water.

It is another object to provide a system, or vessel that produces hydrocarbons by cultivating algae and catalyzing said algae with a catalyst to create a hydrocarbon product.

It is another object to provide a clean burning fuel that is economical enough for power companies to generate a profit, by lowering the current costs for using turbines to generate electricity at levels above the base load energy level.

It is another object of this invention to provide potable water from sea water using renewable energy and/or the transpiration processes of plants, trees, and other vegetation.

These and other objects are accomplished by my invention which is set out below.

BRIEF DESCRIPTION OF THE DRAWINGS

FIG. 5 is a schematic of the hydrocarbon production process of the invention.

FIG. 6 is a schematic of the electrical power system of the invention.

DETAILED DESCRIPTION OF THE INVENTION

Figure 1:
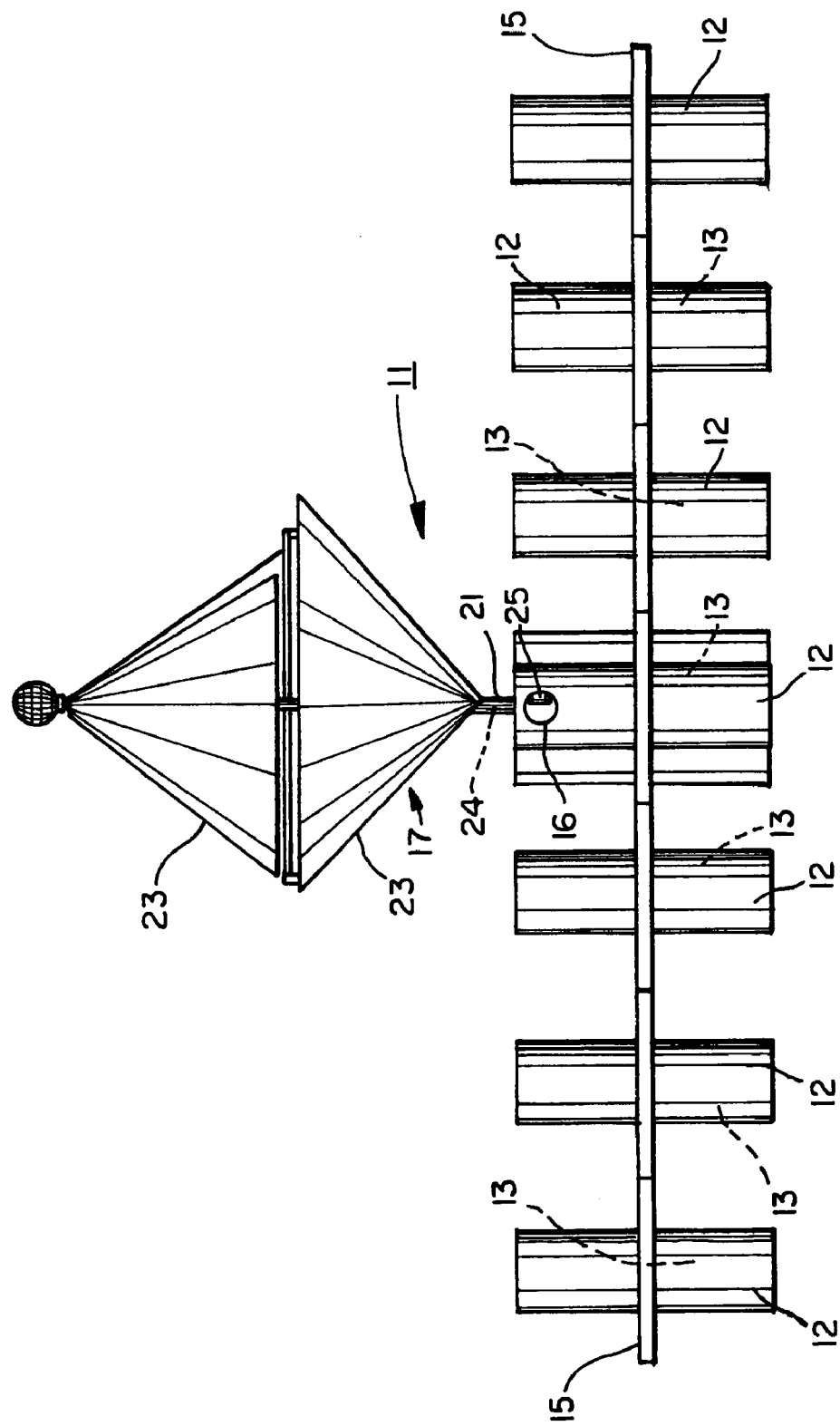
FIG. 1 is a side elevational view of a floating vessel constructed in accordance with the invention, with the structural cables not shown. The structural cables are not shown in FIG. 1 or FIGS. 2-3 so as not to block the view of other components of the vessel. However, the structural cables are shown in FIG. 4.
Figure 2:
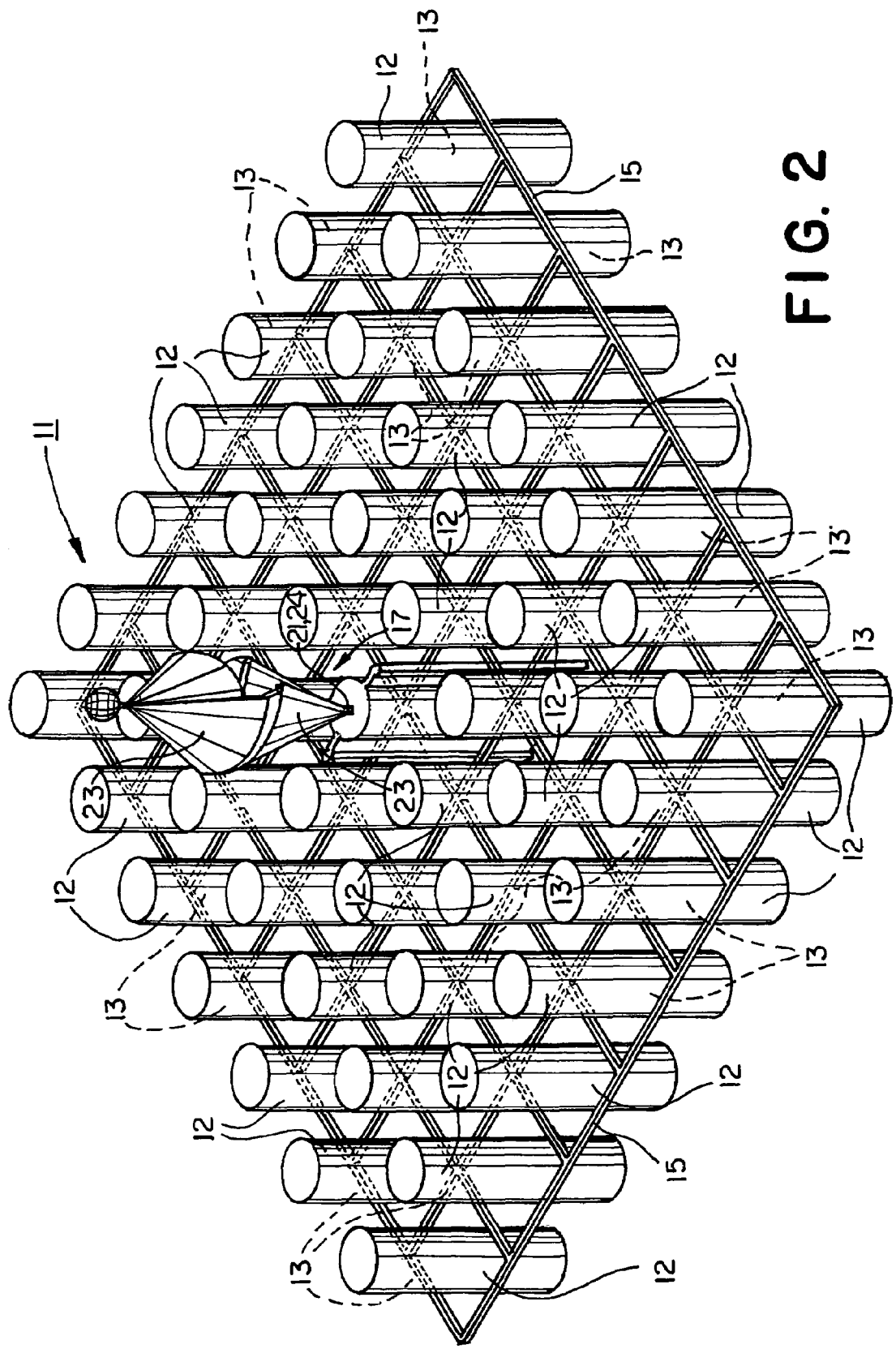
FIG. 2 is a perspective view of the floating vessel of FIG. 1.

Turning to the drawings, there is shown a floating vessel 11 for producing hydrocarbons comprising one or more containers 12 having a chamber 13 formed therein, a structural frame 15 for interconnecting the one or more containers 12, a power system 16 for producing, storing, and distributing power, and a hydrocarbon processor 27.

Figure 4:
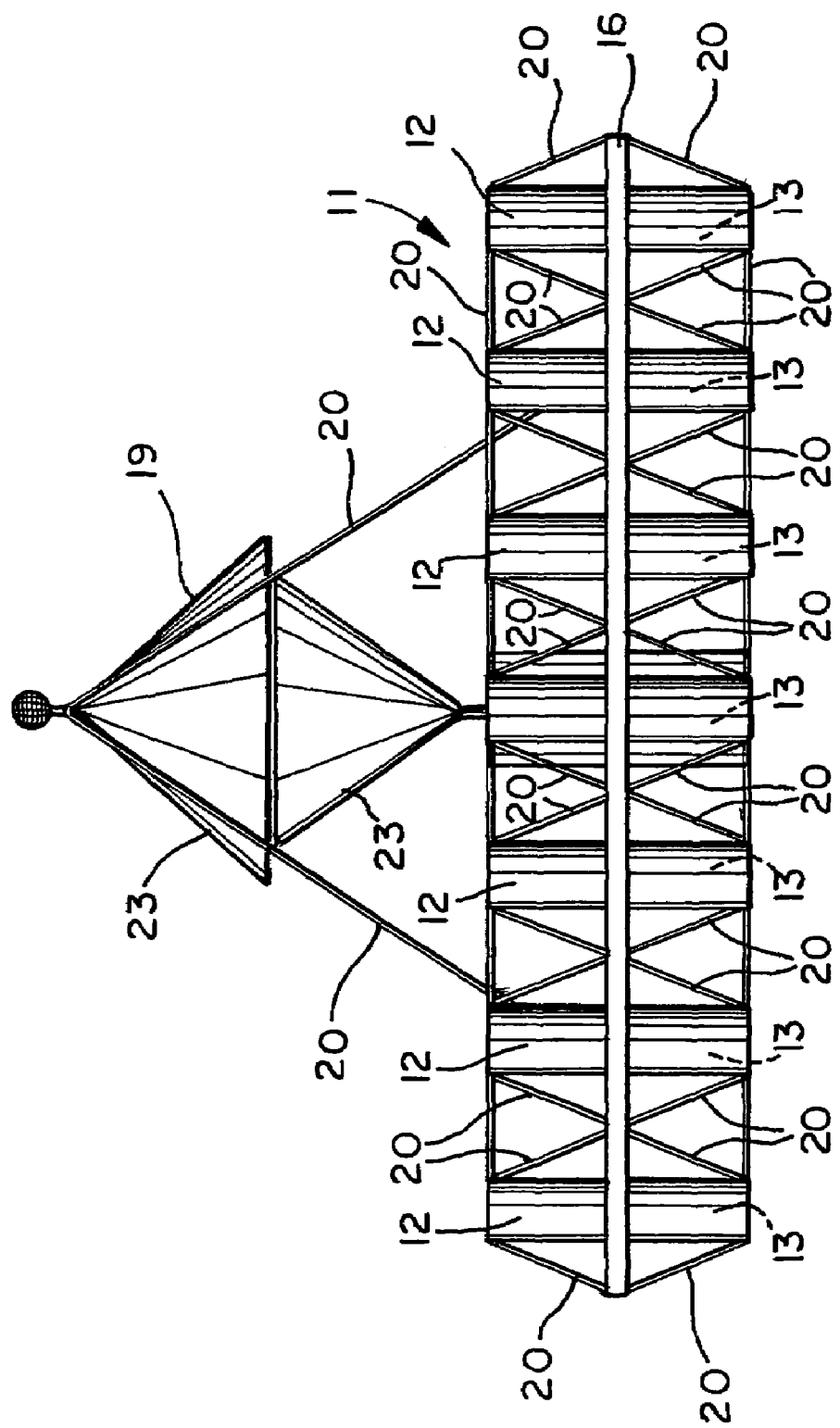
FIG. 4 is a view in side elevation of the vessel of FIGS. 1-3, illustrating the placement of the structural cables.

In the preferred embodiment shown in the drawings, the structural frame 15, using structural cables 20; as shown in FIG. 4, has a tensigrity structure using a third magnitude octal truss 16 made of aluminum and stainless steel.

Figure 3:
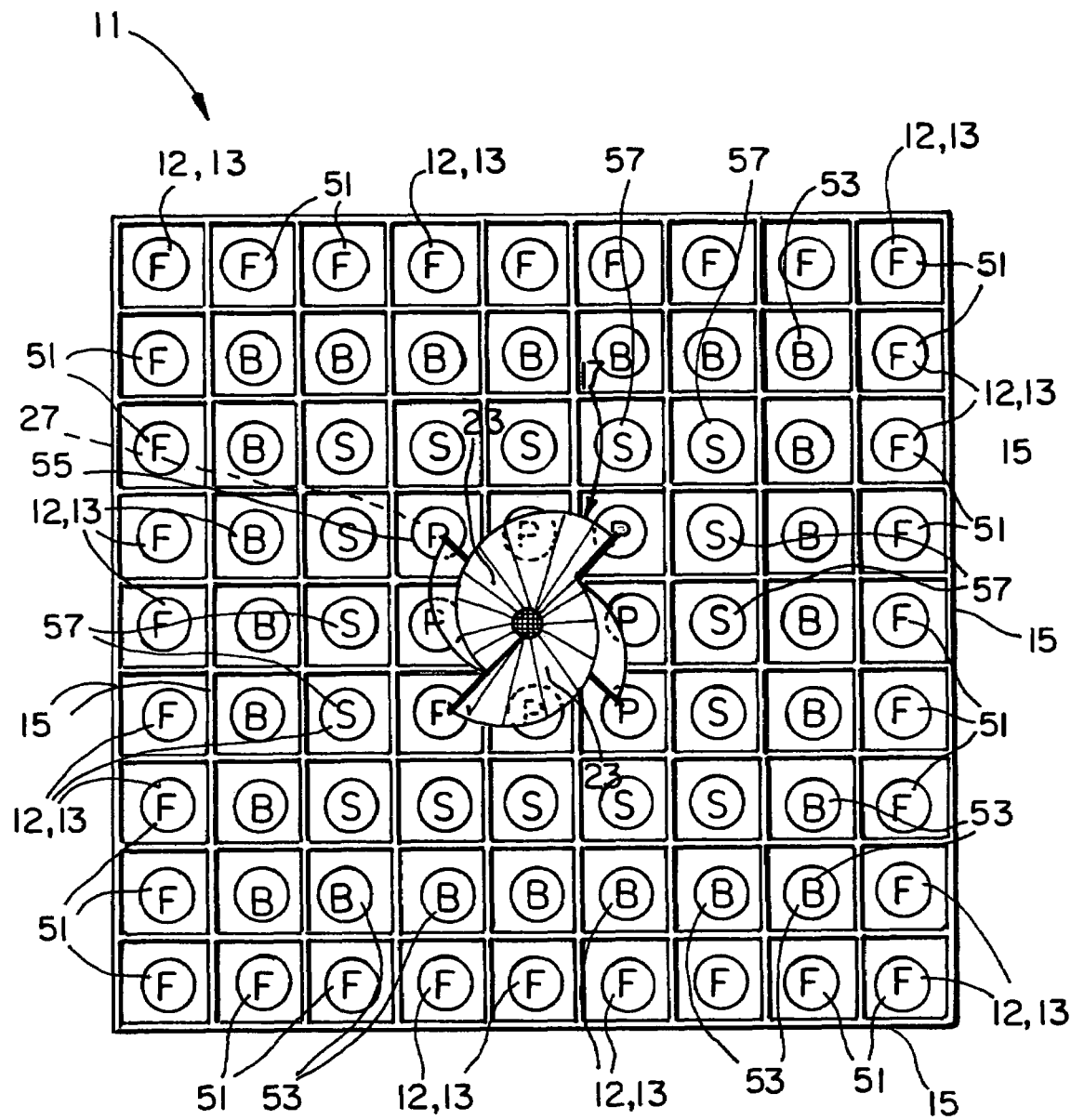
FIG. 3 is a top plan view of the floating vessel of FIG. 1.

In this preferred embodiment, as shown in FIG. 3, vessel 11 has 81 separate containers 12 in a 9×9 array. The chambers 13 of the containers 12 serve, variously, as floatation chambers 51 (also marked with the letter "F" in FIG. 3), ballast chambers 53 (also marked with the letter "B" in FIG. 3), process chambers 55 (also marked with the letter "P" in FIG. 3), and storage chambers 57 (also marked with the letter "S" in FIG. 3). Preferably, the outer containers 12 act as flotation chambers 51 and ballast chambers 53 exclusively to protect the stored hydrocarbon in the event of a collision. Regarding storage, the hydrocarbon produced, such as ethanol, preferably may be stored in flexible bladders that are positioned in storage chambers 57. Preferably, storage chambers 57 are positioned inwardly of ballast chambers 53 and floatation chambers 51, and three containers 12 (a flotation chamber 51, a ballast chamber 53, and a storage chamber 57) must be compromised for ethanol to leak. Moreover, the ethanol would be diluted to 20 percent by the water that the vessel 11 is in, well below flammability and toxicity levels. In this preferred embodiment, the structure is extremely strong, able to withstand 5000 psi, but it only weighs 6 tons empty.

The power system 16 comprises a wind turbine 17, an electrical generator 25, and a power storage and regulation element 19. The wind turbine 17 harnesses the wind energy. The wind turbine 17 has a rotatable shaft 21 and one or more rotor blades 23 connected to the rotatable shaft 21. The rotatable shaft 21 is preferably hollow and is rotatably mounted over a hollow mast 24 of the vessel 11. An electrical generator 25 is mechanically coupled with the rotatable shaft 21 for producing electrical energy when wind blows against the one or more rotor blades 23 causing the rotatable shaft 21 to rotate around the mast 24.

The rotor blades 23 are cup shaped to catch the wind, and are preferably lined with aluminum, which gives the vessel 11 enhanced radar visibility. Preferably, the rotor blades 23 are made of soft construction and are slow moving in nature to prevent being a hazard to sea birds. Preferably, the power storage and regulation element 19, which is linked to the generator 25, comprises batteries and a battery charging system, which stores energy from the generator 25.

Disposed within one or more chambers 13 is a hydrocarbon processor 27. The hydrocarbon processor 27 comprises a carbon dioxide interface 29 (shown in FIG. 5) for introducing carbon dioxide to the hydrocarbon processor 27. The processor 27 further comprises an electrolizer 35, which is powered by electrical energy from the power storage and regulation element 19, for converting water, via electrolysis, into hydrogen and oxygen for providing a hydrogen effluent stream 37. The processor 27 further comprises a reverse water gas shift (RWGS) reactor 45 adapted to receive the hydrogen effluent stream 37 and the carbon dioxide and oxygen in a stream 41 from the electrolyzer 35, for converting the carbon dioxide and hydrogen in the presence of a catalyst into an RWGS effluent stream 47 comprising carbon monoxide and water. The processor 27 has an ethanation reactor 49 adapted to convert the RWGS efffluent stream 47 in the presence of a catalyst into the product hydrocarbon.

In the preferred embodiment of the invention illustrated in the drawings, the vessel 11 is provided with a vacuum pump 50 which draws water from the body of water/water source 9 in which the vessel 11 is located into and through a passageway extending along the central axis of the hollow mast 24 to a flow line 52 leading into the electrolyzer 35. Specifically, the water is drawn up from the body of water/water source 9 using the vacuum pump 50 and taken through the passageway in the mast 24 to the upper end portion of the mast 24, where the water is vaporized through flash distillation. The vaporized water is then condensed and fed to the electrolyzer 35. Preferably, 40 gallons of water per minute is drawn by the vacuum pump 50.

The carbon dioxide interface 29 preferably comprises a chamber 33 that is open to the surrounding air, and the chamber 33 is provided with a vent through which carbon dioxide contained in the air in the chamber 33 is drawn and absorbed into the condensed water being fed into the electrolyzer 35 through line 52.

In the preferred embodiment illustrated herein, the vessel 11 is 82 feet long and has a beam of 82 feet. In this preferred embodiment, the vessel 11 extends 73 feet above water in use. In this preferred embodiment, the draft (empty) is 3 feet and the draft (loaded) is 6 feet. In this preferred embodiment, the vessel 11 displaces approximately 6 tons (empty) and 250 tons (loaded), has a storage capacity of 80,000 gallons, and travels at a top speed of 14 knots. In this preferred embodiment, the electrical generator 25, is a 1000 kilowatt generator.

As for auxiliary systems, the vessel 11 preferably is provided with its own propulsion system which is controlled by an onboard computer or by remote commands from a control center on land. Also, the vessel 11 preferably is provided with GPS tracking, radar, sonar, video (visible and infrared), and equipment to measure environmental conditions such a wind speed, wind direction, air temperature, water temperature, salinity, and currents.

Preferably, the vessel 11 is controlled by remote operation via a satellite or VHF emergency controls, but also is capable of autonomous operation via a predetermined instruction set.

The control system provided to the vessel 11 allows for the operation and monitoring of the power system 16 and the hydrocarbon processor 27, according to optimal design parameters for the production of the hydrocarbons.

The power storage and regulation element 19 is connected to and supplies power to the various systems of the vessel 11, such as the processor 27, the onboard computer, and the various auxiliary systems.

Preferably, the vessel 11 is constructed of aluminum and plastic (PVC, HDPE, Shearfil, and Tefzel).

In use, the vessel 11 is positioned in a body of water, such as the ocean or a lake, to have access to a water source and a wind source. Wind blowing against the rotor blades 23 of the wind turbine 17 causes the rotatable shaft 21 of the wind turbine 17 to rotate to drive the electrical generator 25 to produce electrical energy. Preferably this mechanical coupling is achieved by means of a gear train 89, wherein a sun gear 91 is attached to and shares the same axis with the rotable shaft 21. The sun gear meshes with on or more planet gears 93, which share a central axis with a planet shaft 95, which is mechanically coupled with electrical generator 25. The electrical energy produced by the generator 25 is transferred to the power storage and regulation element 19 for storage and subsequent use by the vessel 11.

During use, electricity from the power storage and regulation element 19 is transferred to the electrolyzer 35 and the vacuum pump 50 to drive these units. Alternately, the vacuum pump 50 is driven by being mechanically coupled to the wind turbine 17. Preferably this mechanical coupling is achieved by means of a gear train 89, wherein a sun gear 91 is attached to and shares the same axis with the rotable shaft 21. The sun gear meshes with on or more planet gears, which share a central axis with a planet shaft 95, which is mechanically coupled with vacuum pump 50.

Vacuum pump 50 draws water from the body of water in which the vessel 11 is located and into and through a passageway 63 extending along the central axis of the hollow mast 24 to the upper end portion of the mast 24, where the water is vaporized through flash distillation. The vaporized water is then condensed and fed to the electrolyzer 35. Prior to entering the electrolyzer 35, the condensed water absorbs carbon dioxide at the carbon dioxide interface 29. The electrolyzer 35 converts the water via electrolysis, into hydrogen and oxygen, and this hydrogen, oxygen, and the carbon dioxide absorbed by the condensed water fed to the electrolyzer 35 are then fed to the RWGS reactor 45, which converts the carbon dioxide and hydrogen in the presence of a catalyst into the RWGS effluent stream 47 which comprises carbon monoxide and water. The RWGS effluent stream 47 is then fed into the ethanation reactor 49, which converts RWGS effluent stream 47 in the presence of a catalyst into the product hydrocarbon.

Figure 12:
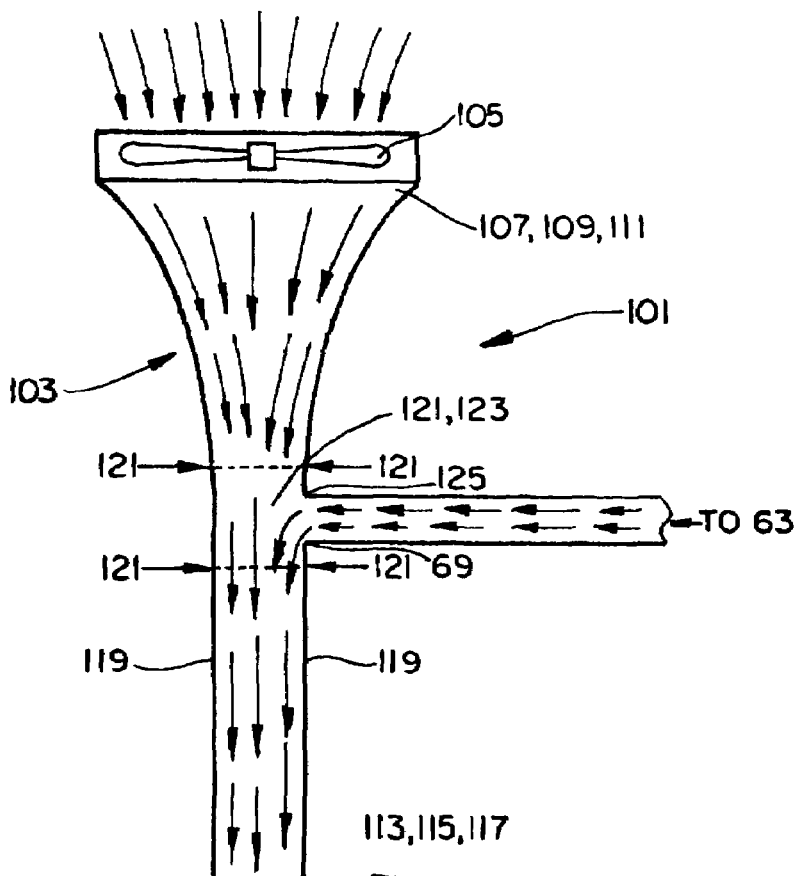
FIG. 12 is a partial sectional plan view of a vacuum system.

As discussed herein, the vacuum pump 50 may be substituted with a venturi system 101 to exert a vacuum extracting water vapor 76 from water 68 through flash distillation in a similar fashion as the vacuum pump 50. Turning to FIG. 12, there is shown in partial plan view the venturi system 101. The system 101 including a venturi duct 103 and a fan 105, the venturi duct 103 defined by an upstream opening 107 defining a first cross sectional area 109 at a first end 111, a downstream opening 113 having a second cross sectional area 115 at a second end 117 and one or more duct walls 119 connecting the upstream opening 107 to the downstream opening 113. The venturi duct 103 further having a throat section 121 defined by the one or more duct walls 119 located between the upstream opening 107 and the downstream opening 113 and having a throat cross sectional area 121 that is less than the first cross sectional area 109.

The venturi system 101 further includes a fan 105 connected or proximate to the upstream opening 107 of the venturi duct 103 for directing a flow of air through the venturi duct 103 from the upstream opening 107 to the downstream opening 113.

In operation, the fan 105 draws an air flow through the throat section 121 through the duct 103, wherein the pressure at the throat section 121 is decreased, and a vacuum is caused to be exerted on the second opening 69 of the conduit 63 because the conduit 63 is in communication with the port 125 located in the one or more duct walls 119 at the throat section 121. As a result, water vapor 76 is pulled from the conduit 63, which is submerged in water 69.

The hydrocarbon product produced by the hydrocarbon processor 27 of the vessel 11 is fed from the ethanation reactor 49 via lines into storage chambers 57, which may be periodically unloaded and used as an energy source, for example, a fuel for driving energy turbines for creating electricity.

The hydrocarbon produced in accordance with the invention is preferably ethanol, but other hydrocarbon products may be produced as desired. Exemplary of these other products are methanol, ethanated olifins (diesel), ethanated esters, and dimethylethane. Such products may be produced using appropriate catalysts in the hydrocarbon processor 27 as is known in the art, to create the appropriate reaction to produce the desired hydrocarbon product.

Exemplary catalysts include iron, copper, iridium, and combinations thereof.

Optionally, pumps may be provided along the lines in the processor 27 as needed when heavier hydrocarbons are being produced.

The vessel 11 may also be configured to collect the byproduct potable water produced by hydrocarbon processor 27.

Preferably, vessel 11 operates away from commercial traffic. The land-based operators may detect—via radar, sonar and video—the presence of other vessels, e.g. ships, from a considerable distance. If required, the vessel 11 may be programmed to detect approaching ships and move to avoid them, or the vessel 11 may be moved by the instructions from an operator. In the event of storms, the vessel 11 attempts first to reach safe waters. If this is impossible, the vessel 11 may submerge itself, if instructed to do so in deep water to avoid waves and other vessels. The vessel 11 preferably broadcasts continuously on both radar and sonar transponders while operating in the open sea.

An exemplary operating area is the Mid-Atlantic coastal area near New Jersey and Delaware. This area has proximity to energy users, favorable wind and sea conditions, and it is a large, relatively shallow area where tankers and freighters tend to stay in well-defined areas. The vessels 11 preferably are shallow-draft, preferably drawing only 6 feet when fully loaded, and may be positioned in areas too shallow for commercial cargo vessels to traverse, preferably areas of 50 feet or less. Generally, the vessels are positioned far enough offshore to be invisible to beach resorts, preferably operating between 10 and 30 miles off-shore.

In a preferred embodiment, the vessel 11 is configured to possess a number of failsafe measures. If a vessel 11 loses the link to the control center, it may be programmed to immediately cease production, and attempts to re-establish a link via VHF. If this fails, the vessel 11 may be programmed to immediately go to station-keeping mode and to activate its transponders, lights and horns as needed. If no contact is made within four (4) hours or storm conditions occur while off-link, the vessel 11 may be programmed to submerge itself and deploy a transponder buoy.

Concerning a preferred overall design, the wind turbine 17 is a slow turning vertical axis machine design to be harmless to birds. It has an aluminum shaft 21, stainless steel rigging and Shearfil rotor blades 23. This is an environmentally inert, flexible material developed for the Apollo space suits. The wind turbine 17 stands 65 feet tall and rotates at 23 RPM at full power. It may also be lined with aluminum foil to make it highly visible to radar.

The vessel 11 preferably is illuminated by lights and has both sonar and radar transponders. The operator uses a television camera capable of transmitting images in both the visible and infra-red spectrum for a real-time image of the platform's location.

In a preferred embodiment the operator's display is overlaid with plots of other vessels, if nearby, and weather and sea data, such as temperature, wind speed, direction, humidity. Additional continuous data streams, for example data from the Rutgers Marine Research Center at Tuckahoe, N.J., LEO-15 and NDBC buoy 44009, are also integrated into the display.

The wind turbine 17 generates 1,300 HP at full power and all of this power may be made available through jetpumps, to propel the platform 11. The vessel 11 is a tele-operated/telemetric machine, similar to the Predator drones, and may have an added artificial intelligence function that allows it to report its condition and perform certain functions independently should the need arise. Telemetry is sent continuously in real time, via satellite internet connection, with conventional VHF back-ups. Under normal mode the vessel 11 goes to a location selected by the operator. This preferably is an area clear of commercial shipping and fishing, where the winds are suitable. Once on station, the vessel 11 holds within 100 yards of the preset location using thrusters to hold its position. During the next 12 to 48 hours the vessel 11 produces ethanol and then requests off-loading. When that time is near the vessel 11 moves to a rendezvous with a barge/tug where a crew transfers the hydrocarbon product, e.g. ethanol and brings the hydrocarbon product ashore. All off-loading is done under direct human presence. Once empty, vessel 11 returns to its station to repeat the process. Should bad weather be reported, the platform 11 may off-load to a barge and proceed to a safe harbor, or may move out of the storm path to some other operating area. In an emergency, the vessel 11 may submerge itself so as to not be a hazard to navigation and await retrieval after the storm passes. The vessel 11 can go to 200 feet and hold sufficient compressed air to both hold at that depth for 5 days and refill their ballast tanks to surface when the retrieval commands are received. For additional safety, the Coast Guard, may take over direct operation of the vessels to use as monitoring platforms, if desired.

The vessel 11 can be rated to produce purified water, as an alternative embodiment of the invention, by including a water purifier 61 in addition to or in place of the hydrocarbon processor 27.

Figure 11:
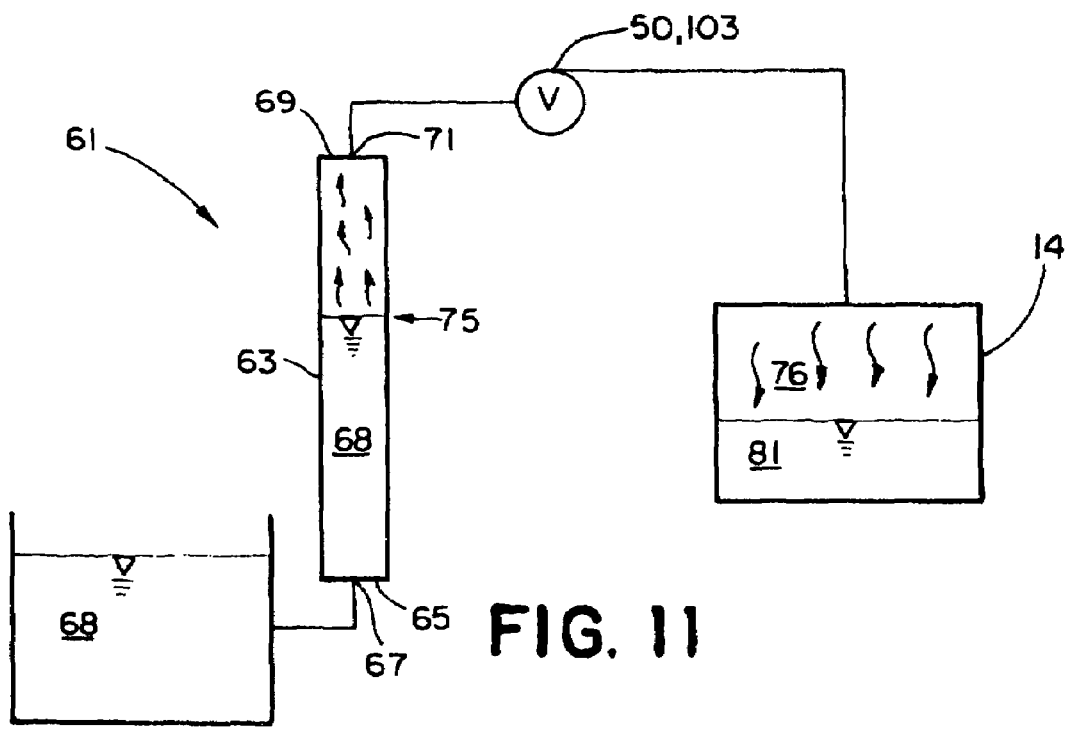
FIG. 11 is a schematic of the water purifier.

Turning to FIG. 11 there is shown a schematic of a water purifier 61. The water purifier 61 including a conduit 63, the conduit 63 comprising a first rim 65 defining a first opening 67, and a second rim 69 defining a second opening 71, and at least one conduit wall 73 extending from the first rim 65 to an elevation that is higher than the phase change elevation 75 of water to the second rim 69. This configuration allows water vapor to separate from the water 68 and travel to the second opening 71 of the conduit 63 when a vacuum is applied to the conduit 63. The water purifier 61 further includes a vacuum device 50/103 for applying a vacuum. As discussed herein the vacuum device 50/103 may comprise a venturi system 103 or a vacuum pump 50 powered by a wind turbine 17 for harnessing the wind energy, the wind turbine 17 having a rotateable shaft 21 and one or more rotor blades 23 connected to the rotateable shaft 21. In use, the first opening of the conduit 63 is submerged in the water 68. The vacuum device 50/103 is in communication with the second opening 71 exerting a vacuum sufficient to reduce the pressure inside the conduit 63 to the vapor pressure of the water 68 thereby raising the water 68 in the conduit 63 to a phase change elevation 75 where the water 68 changes state from liquid to vapor 76, allowing water vapors 76 to be pulled through the vacuum device 50/103 and discharged into a collection container 14 to collect condensed water 81.

In operation water is produced by turning a wind turbine 17 to effect generation of electricity in a generator 25, transferring electricity produced by the generator 25 to enable a vacuum device 50/101 and/or one or more process controls. A vacuum is then exerted on a water source 9 to extract water vapor 76. The water vapor 76 is then condensed and water vapor 76 that has condensed as water is collected. As discussed herein the step of exerting a vacuum on a water source to extract water vapor 76 may comprise providing a conduit 63, the conduit 63 comprising a first rim 65 defining a first opening 67 a second rim 69 defining a second opening 71 and at least one conduit wall 73 extending from the first rim 65 to an elevation that is higher than the phase change elevation 75 of water to the second rim 69 thereby allowing water vapor 76 to separate from the water 68 and travel to the second opening 71 of the conduit 63 with a negative pressure/vacuum is applied to the conduit 63. The first opening 67 of the conduit 63 is submerged in water 68. The second opening of the conduit 63 is then connected to a vacuum pump 50. A negative pressure is then applied to the second opening 71, of the conduit 63 with the vacuum pump 50, thereby causing water 68 from the water source 9 to be drawn upwardly into the conduit to the phase change elevation 75 wherein water vapor 76 is separated from the water 68 and pulled toward the second opening 71 of the conduit 63 into a collection container 14, wherein the vapors cool and collect as for condensate.

Alternately, the step of exerting a vacuum on a water source 9, 68 to extract water vapor 76, comprises providing a venturi system 101 as disclosed herein. The method further includes the step of providing a conduit 63, the conduit 63 comprising a first rim 65 defining a first opening 67, and a second rim 69 defining a second opening 71, and at least one conduit wall 73 extending from the first rim 65 to an elevation that is higher than the phase change elevation 75 of water to the second rim 69. The conduit 63 allows water vapor 76 to separate from the water 68 and travel to the second opening 71 of the conduit 63 when a negative pressure is applied to the conduit 63. The first opening 67 of the conduit 63, is then submerged in water 68 the second opening 71 of the conduit 63 is connected to a port 125 located in one or more duct walls 119 at the throat section 121 of the venturi duct 103. Air is then forced through the duct 103, thereby exerting a vacuum on the second opening 69 of the conduit 63, causing water vapor 76 to separate from the water 68 inside the conduit 63 and travel to the second opening 69 of the conduit 63 wherein the vapor 76 is pulled through the venturi duct from the port 125 to the downstream opening 113 into a collection container 14, wherein the vapors cool and collect as for condensate.

The step of forcing air through the duct 103 preferably comprises directing wind from a fan 105 into the duct 103.

In one embodiment of the vessel 11 configured to produce purified water, the conduit 63 can reside within and extend along the central axis of the hollow mast 24. In other embodiments, the conduit 63 can extend upwards without being integral to the hollow mast 24.

Figure 8:
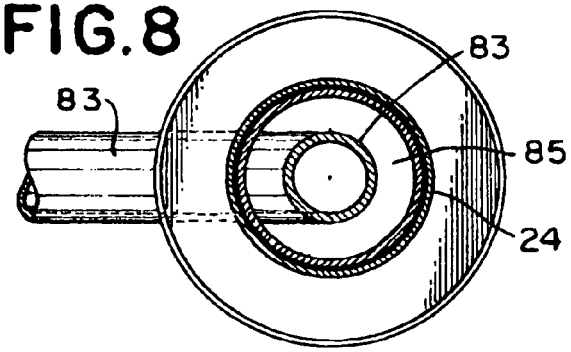
FIG. 8 is a plan cross section view of the hollow mast.
Figure 9:
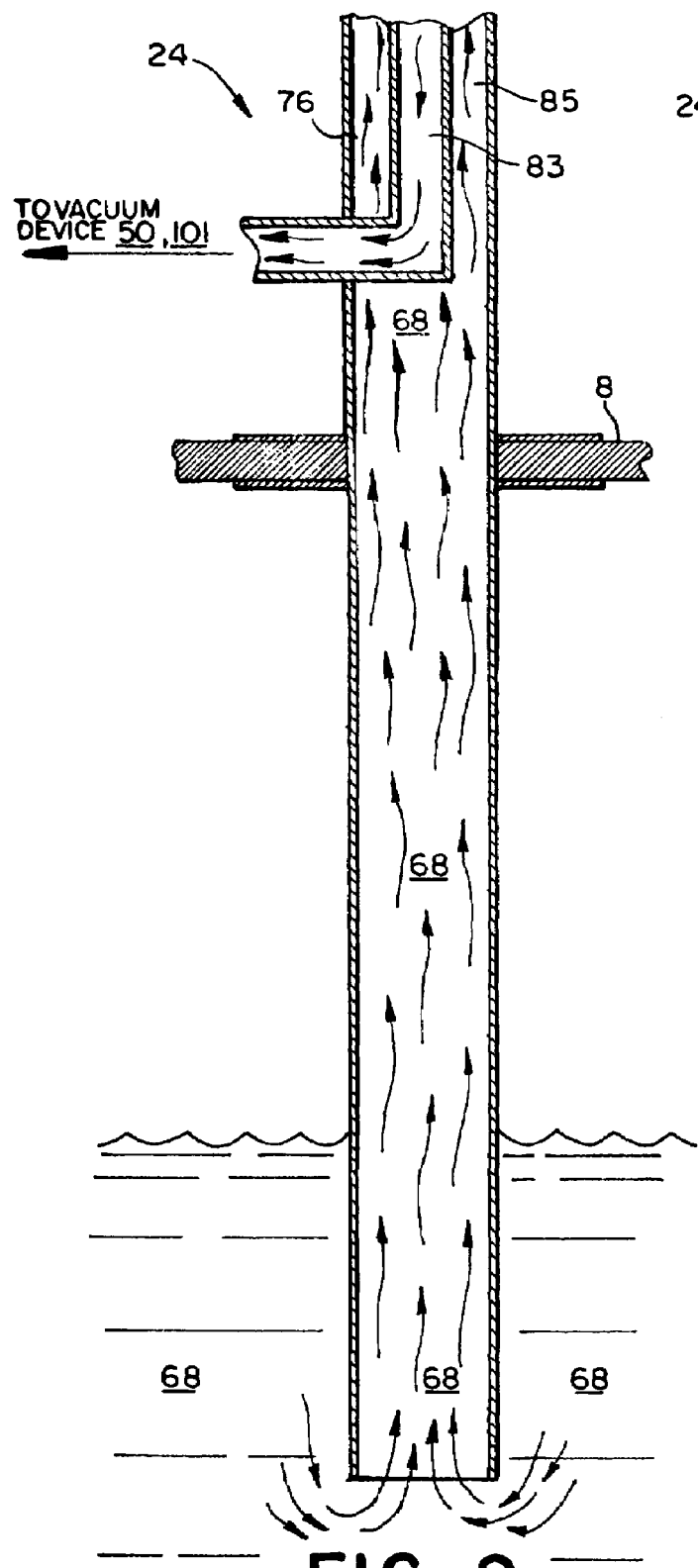
FIG. 9 is an elevational cross sectional view of the hollow mast shown at its interface with the source water.
Figure 10:
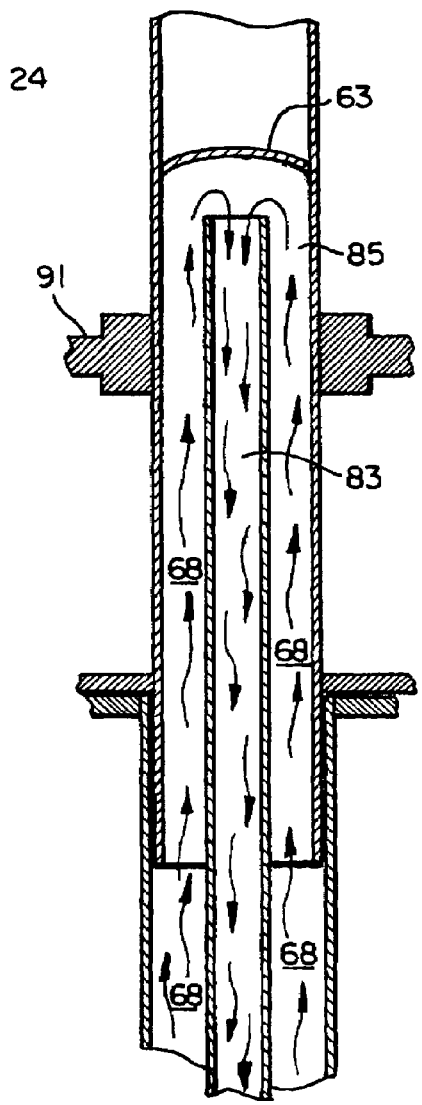
FIG. 10 is a view and cross section of the hollow mast at the upper portion.

FIGS. 8, 9, and 10 show how the conduit 63 can be integral to the hollow mast 24. The lower opening 67 of the conduit 63 is submerged in the source water 68 where the vacuum pump 50 exerts a vacuum on the conduit 63, pulling the source water 68 through the annular portion 85 of the hollow mast 24. The vacuum pump 50 being connected with the center portion 83. At a point above the phase change elevation 75, the center portion 83 is joined with the annular portion 85 of the hollow mast 24 so to communicate the vapor 76 existing above the phase change elevation 75 through the vacuum pump 50 to a condensate tank 14, which in this embodiment can be one or more of the containers 12 of the vessel 11.

Figure 7:
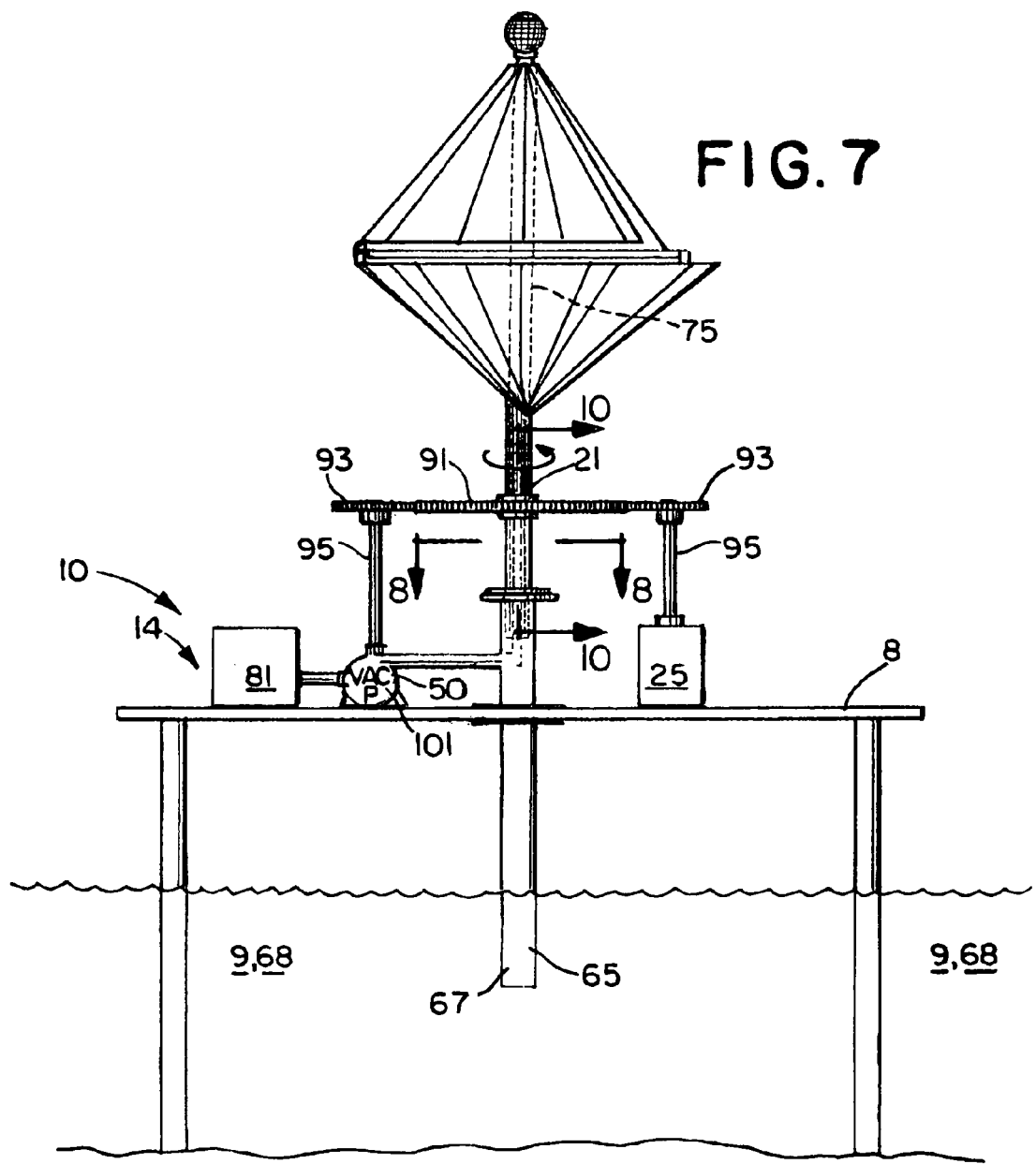
FIG. 7 is a side elevational view of a platform system housing the invention.

An alternate embodiment is shown in FIG. 7 which shows a system 10 affixed to a platform 8 extending over a body of water for producing purified water from wind energy and water. The platform system 10 comprises a power system 16 for producing, storing, and distributing power. The power system 16 includes a wind turbine 17 for harnessing the wind energy, the wind turbine 17 having a rotatable shaft 21 and one or more rotor blades 23 connecting to the rotatable shaft 21. The power system 16 further includes an electrical generator 25 which is mechanically coupled via a gear train 89 with the rotatable shaft 21 for producing power when wind contacts the one or more rotor blades 23 causing the rotatable shaft 21 to rotate thereby producing power. The power system 16 further includes a power storage and regulation element 19 for regulating and storing the power produced by the generator 25. The system 10 for producing purified water further includes a water purifier 61. The water purifier 61 includes a conduit 63 comprising lower rim 65 that defines a lower opening 67 an upper rim 69 defining an upper opening 71 and a conduit wall 73 extending from and connecting the lower rim 65 to the upper rim 69. The water purifier 61 further includes a vacuum pump 50 coupled with the conduit 63 at the upper opening 71 for applying a vacuum. The vacuum pump 50 may be powered by the power storage and regulation element 19, but the vacuum pump 50 is preferably mechanically coupled with and mechanically driven by the rotatable shaft 21 and gear train 89. The platform system 10 would further include a control system for regulating and/or monitoring the power system 16 and the water purifier 61.

In purifying the water the lower opening 67 of the conduit 63 is submerged, in or connected with another conduit that is submerged in, the source water 68 and the vacuum pump 50 exerts a vacuum sufficient to reduce the pressure inside the conduit 63 to the vapor pressure of the water thereby raising the water in the conduit 63 to a phase change elevation 75 where the water changes state from water to vapor 76. The upper opening 71 of the conduit 63 would be extended to an elevation higher than the phase change elevation 75 allowing the water vapor 76 to be pulled through the vacuum pump 50 and discharged to a condensate tank 14, which can be open to atmospheric pressure to collect condensate 81.

In alternate embodiment the water purifier 61 of my invention is provided on a platform 8.

Optionally, the water purifier 61 can further include a heating element 77 applied to the conduit 63 to regulate the temperature of the water and/or the water vapor and to prevent icing in the conduit 63. Optionally, the platform system 10 can further comprise a telemetric system for remote operation and monitoring.

As previously discussed, the water purifier 61 can be located on land, can be integral to a floating vessel, and also can be affixed to a platform 8 suspended over a body of water.

In use, purified water may be produced by providing the system 10 disclosed above, positioning the system 10 on, above, or proximate to a water source 9 turning the wind turbine 17 to affect generation of electricity in the generator, transferring electricity produced by the generator 25 to the vacuum pump 50 to enable the vacuum pump 50. Preferably, the vacuum pump 50 is mechanically driven by the rotatable wind turbine. A vacuum would be created in the conduit 63 to produce water vapor 76. The water vapor 76 would then be pulled through the vacuum pump 50. The water vapor 76 would be discharged to one or more containers 12 which may be open to atmospheric pressure and/or cooled to collect condensate 81.

Furthermore, in use, the purified water can be produced by turning a wind turbine 17 to effect generation of electricity in a generator 25 and to operate the vacuum pump 50, either through the turbine or by the power from the electrical generator 25. The forces of the vacuum pump 50 would create a vacuum in the conduit 63 to produce water vapor 76. Next, the water vapor 76 would be pulled through the vacuum pump 50 and then discharged to the one or more containers 12, which may be open to atmospheric pressure and or cooled to collect condensate water 81.

In an alternate embodiment the system 10 can be rated to produce hydrocarbons using air, water and wind. In this embodiment the platform system 10 would include the hydrocarbon processor 27 discussed herein.

Optionally, the system 10 equipped with telemetric equipment to provide for remote operation and monitoring. As a further option, the platform system 10 is equipped with control equipment to allow for autonomous operation.

The system 10, optionally, is configured to offload the product hydrocarbon or purified water by mean of a pipeline extending from the platform system 10 to a remote terminal.

Figure 13:
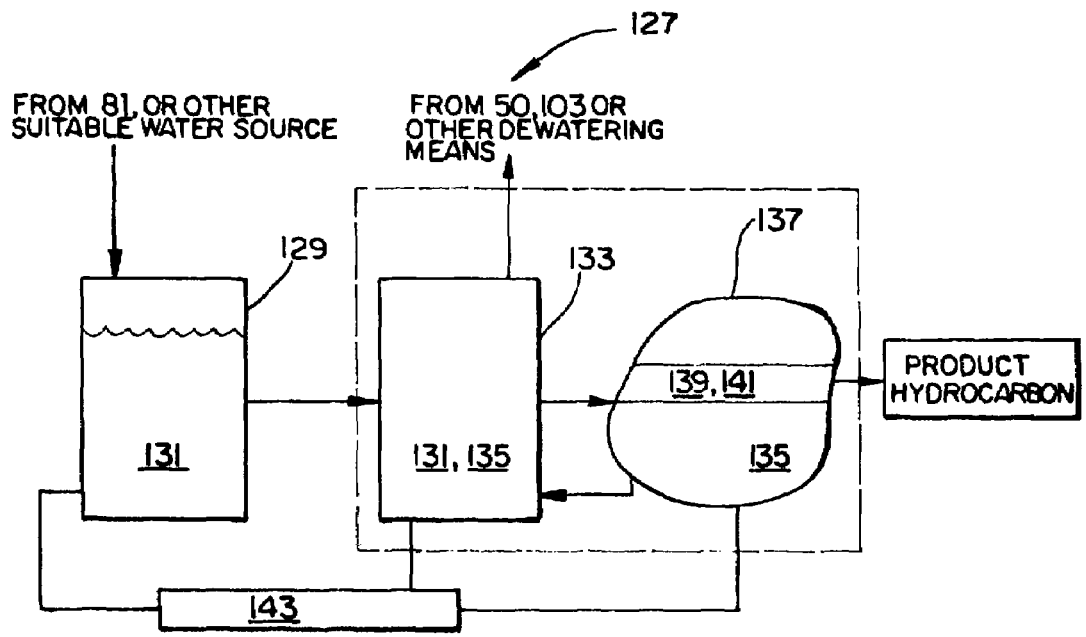
FIG. 13 is a schematic of the algae derived hydrocarbon production system 127 and process of the invention.

Turning to FIG. 13 there is shown an algae based hydrocarbon processor 127, including a cyanobacteria cultivator 129 for cultivating a solution of cyanobacteria 131 utilizing the condensate water 81. Initially the cultivator 129 is inoculated with a colony. The cyanobacteria cultivator/algae cultivator 129, is contained in an environment that is conductive to the growth of algae/cyanobacteria said environment includes proper light, air, and temperature conditions and ability grow at an optimum rate. The algae based hydrocarbon processor 127 further includes a solution optimizer 133 for adjusting the amount of water 68 in the solution of cyanobacteria 131 and to create an optimized solution 135 of cyanobacteria and water. An optimized ratio is 9 to 1 cyanobacteria (such as spirulina) to water by mass. This is accomplished by adding water or reducing water in the solution of cyanobacteria 131. Reducing the water can be accomplished in a number of ways, which include heating or boiling or decanting the water, but preferably it is accomplished by connecting the solution optimizer 133 to a vacuum device 50/101. The vacuum device 50/101 preferably being a vacuum pump 50 or a venturi system 103. The hydrocarbon processor further includes a catalyzer 137 for causing a portion of the optimized solution 135 of cyanobacteria and water to reach a supercritical state where in a portion 139 of the optimized solution 135 is broken down into its elemental constituents creating a postsupercritical portion 141 of the optimized solution 135. The postsupercritical portion 141 being allowed to cool and condense as a hydrocarbon. The hydrocarbon processor 127 may further include a control system 143 for monitoring and controlling the various component of the hydrocarbon processor 127.

A portion of the remaining solution may be returned to the solution optimizer 133 in later steps to be reoptimized or adjusted based on the amount of water and then passed again to the catalyzer 137 for catalyzation to obtain more hydrocarbon product.

In one embodiment, the catalyzer 137 may comprise a pressure vessel having electrodes disposed within the pressure vessel for applying an electrical current to the optimized solution 135.

Figure 14:
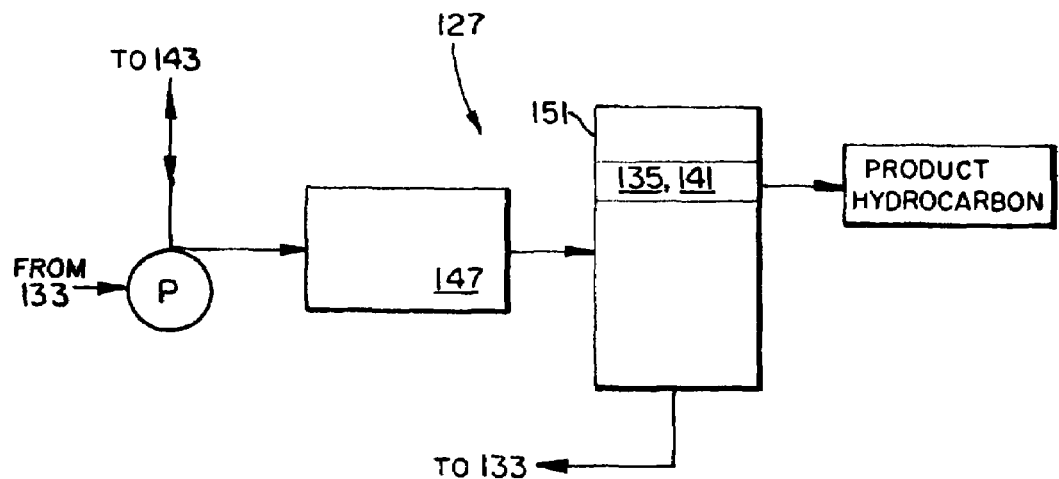
FIG. 14 is a schematic of the algae derived hydrocarbon production system 127 and process of the invention utilizing a cavatation inducing nozzle as a catalyzer.
Figure 15:
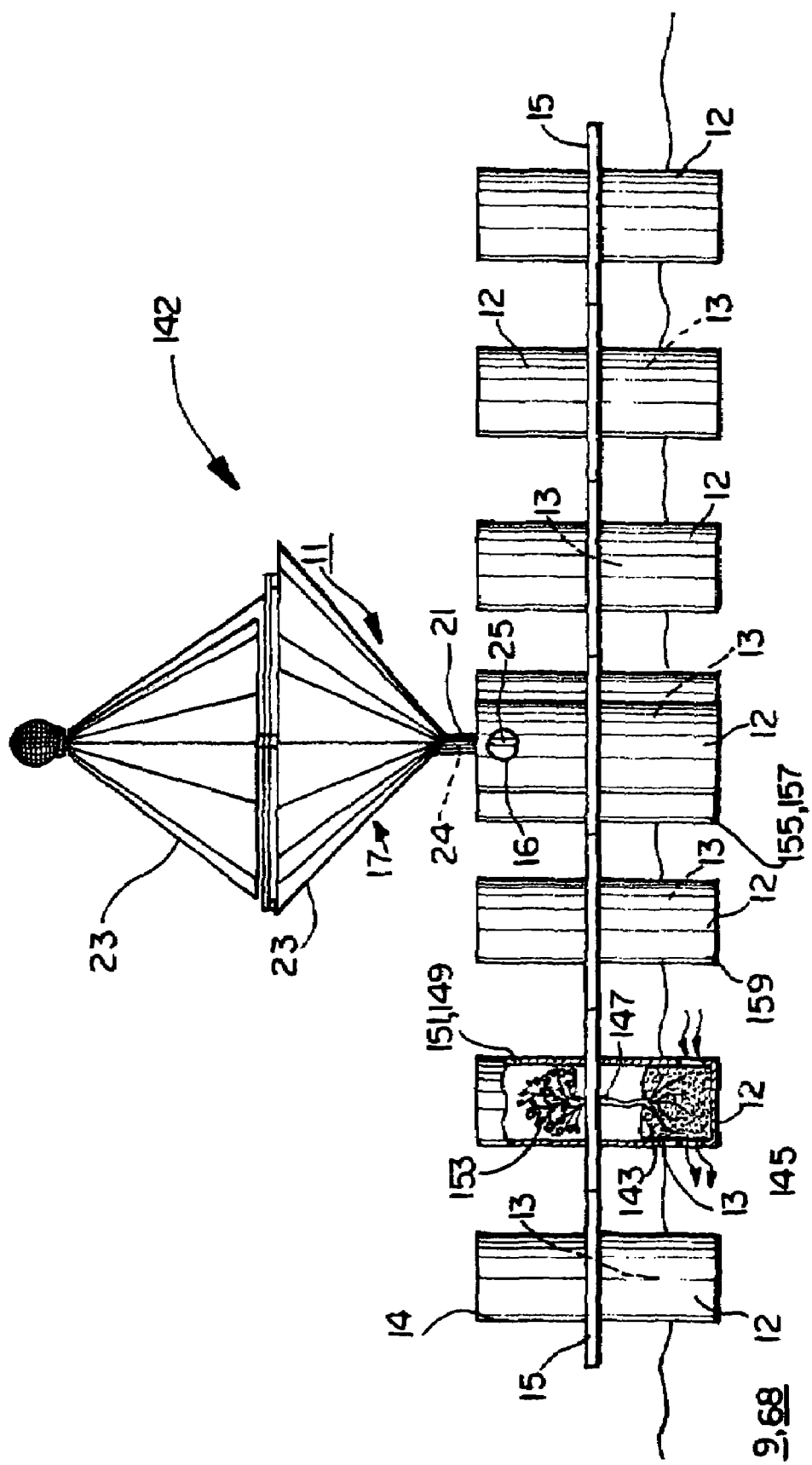
FIG. 15 is a partial side elevational view of a floating vessel rated to produce water using trees, plants, bushes, and other vegetation.

In an alternate embodiment, (FIG. 14) the catalyzer comprises a cavatition inducing nozzle wherein the optimized solution 135 is forced through said nozzle 147 with a pump 149, causing a portion of the optimized solution 135 to reach a supercritical state wherein said portion of the optimized solution 135 is reduced into its elemental constituents creating a postsupercritical portion 141 of the optimized solution 135 containing hydrocarbons after cooling and condensing in a condensing container 151.

It is known that organic molecules can be re-organized using super-critical pressures and temperatures. These changes occur when the molecules are heated to 1200+ degrees F. and entrained in a pressure vessel. What is less commonly known is these conditions of pressure and temperature occur inside cavitation bubbles. The principle of this apparatus is the controlled creation of cavitation in such a manner as to entrain a portion of a fluid containing water and organic molecules and subject the fluid to super-critical conditions.

The energy required to affect this change is then that energy required to bring the fluid to sufficient velocity and temperature to cavitate in a controlled manner.

Assume one gallon of fluid being sent through a typical linear venturi:

To induce cavitation requires a velocity of 100 feet per second if the fluid is at 150 degrees F. Using Boyle's law the change in velocity reduces the pressure to less than the vapor pressure of the fluid, inducing cavitation.

The energy required to accelerate the flow to 100 fps is 0.06 hp/gallon or 204.84 btu.

[Eulers Equation: $V^2/2*g = 100^2/2*32.2 = 10000/64.4 = 155.28$ ft=$H$hp=$Q*H$/3960=(1 gal*155.28)/3960=0.039 hp assume efficiency of 65%=0.039/0.35=0.06 hp]

Each pass through the venturi converts 3% of the fluid.

1 hp=2544 BTU

Therefore it requires 1404.84/0.03 or 46800 btu.

Based on lab tests, the resulting fluid contains 127,000 btu/gallon.

Thus the venturi reduces the conversion energy requirement to 35.34% of the energy produced.

Cavitation is a phenomenon that occurs under predictable conditions, but location of individual bubbles can not be calculated. The venturi redirects the energy of cavitation, normally associated with a 2 dimensional wave front, first into a controlled tetra-helical vortex, then compresses the three vortices into a rotating flow that also spirals around a center. In this way the energy distribution inside the flow is controlled, directed and non-random.

The primary rotation is nearly 15000 rpm. The pressure inside this rotating zone is absolute zero and the temperature is 1500 degrees F. However this zone is only 1000 Angstroms in diameter. The flow entrained inside the spiral is rotating at 2000 rpm inside a zone 0.04 inches in diameter. Its pressure is also absolute zero and its temperature is 630 degrees F. Since it is not ionized like the flow inside the primary vortex, there is an exchange of energy between the 2 zones causing oscillating zones of gas and liquid to exchange energy in a 'worm-like' motion. In this manner the cavitation is entrained inside the spiral.

The spiral is formed by the excess energy, commonly called turbulence, being focused to a single location, inducing a local vortex and allowing laminar flow in the rest of the stream. These phenomena are micro-events inside an otherwise stable streamline.

The invention of the algae based hydrocarbon processor 127 may be incorporated with a power system 16 for producing, storing, and distributing power. The power system 16 including the power system 16 as disclosed herein. Alternately, the algae based hydrocarbon processor 127 may be powered by more conventional means if available, such as grid power or power from a generator, or solar power, or any other power source.

The algae based hydrocarbons processor 127 may be incorporated into a floating vessel 11 as described herein or provided on a platform 8 proximate to a water source as disclosed herein. If the vessel 11 or platform 8 is placed on/proximate to a water source that has water of sufficient quality to cultivate the algae, the flash distillation equipment may not be necessary.

In operation, hydrocarbons are produced from algae and wind energy by performing the following steps: A wind turbine 17 is turned to effect generation of electricity in a generator 25. The electricity produced by the generator 25 is transferred to enable any electrically operated devices. A vacuum is exerted on a water source 9,68 to extract water vapor 76. The water vapor 76 is then condensed and used to cultivate cyanobacteria to create cyanobacteria solution 131. The amount of water in the solution 131 is then adjusted to obtain an optimized solution 135 of cyanobacteria and water. The optimized solution 135 is then catalyzed, causing a portion of the optimized solution 135 to reach a supercritical state, wherein a portion of the optimized solution 135 is broken down into its elemental constituents creating a postsupercritical portion 141 of the optimized solution 135. The optimized solution 135 and the postsupercritical portion 141 of the optimized solution 135 are then allowed to cool and condense, thereby forming a hydrocarbon product from the postsupercritical portion 141.

In one embodiment the optimized solution 135 is catalyzed by applying an electrical current to the optimized solution 135. In an alternate embodiment, the optimized solution 135 is catalyzed by forcing the optimized solution 135 through a cavatation inducing nozzle, causing a portion of the optimized solution 135 to reach a supercritical state, wherein said portion of the optimized solution 135 is broken down into its elemental constituents creating a postsupercritical portion 141 of the optimized solution 135.

Alternately, water is purified using my invention by providing a transpiration system 142 adapted to a floating vessel 11 for producing purified water comprising one or more containers 12 having a chamber 14 therein a structural frame 15 for connecting the one or more chambers 12, at least one of the one or more chambers 12 being a root chamber 143 for containing a root portion 145 of a plant or tree or similar vegetation 147. Preferably halophytic plants are used in a saltwater environment to provide purified water via transpiration. At least another 149 of the one or more chambers 13 being a transpiration chamber 151 containing a nonroot containing portion 153 of the plant 147. The invention further includes a temperature and humidity controller 155 for providing the root portion 145 of the plant and the nonroot portion 153 of the plant 147 with an optimum environment for transpiring water vapor. Further included is a nutrient controller 155 for maintaining the optimum delivery of nutrients to the root portion 145 of the plant 147 and or the nonroot portion 153 of the plant 147. The system further includes a lighting controller 157 for maintaining optimum lighting within at least one of the one or more containers 12. Further included in my invention is a power system 16 as disclosed herein including a wind turbine 17 electrical generator 25 and a power storage and regulation element 19. Also included in the transpiration system 142 of my invention is a cooling container 159 that is ported to the nonroot chamber 151.

In operation the temperature and humidity controller 155 is powered by the power system 16 and adapted to maintain optimal temperature and humidity, the nutrient controller is enabled to maintain optimal delivery of nutrients to the plant 147, and the lighting controller is enabled to maintain optimal lighting to the one or more containers 12, and where water passes into the root chamber 143 containing the root portion 145 of the plant 147 and the plant 147 absorbs the water 68 and transpires water vapor 76 from the nonroot portion 153 of the plant 147 into the transpiration chamber 151, or the water vapor 76 passes into the cooling container 159 and condensate 81 is collected.

Figure 16:
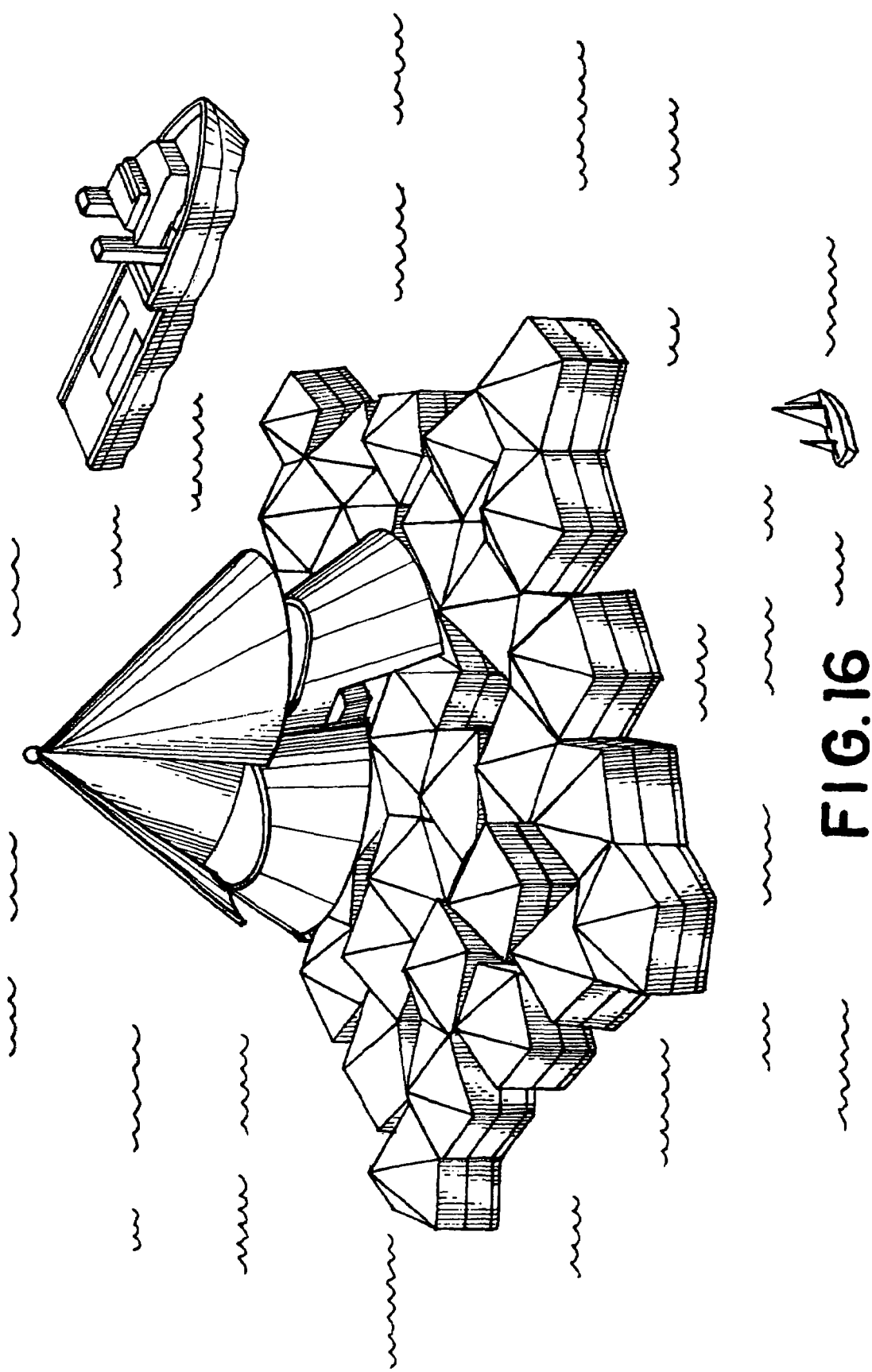
FIG. 16 is an isometric view of a floating vessel rated to produce water using trees, plants, bushes, and other vegetation.

As applied to purifying contaminated and/or sea water, and referring to FIG. 16, the plants are selected for ability to absorb, filter or disassemble the contaminants. They are then placed in an artificial environment where all relevant factors such as light levels, gas levels, nutrient levels, temperature and humidity are controlled and maintained at an optimal condition for the species.

The contaminated water is circulated around the plant roots. Via its natural transpiration, the plant absorbs the water and either filters the contaminants or disassembles them during photosynthesis. Pure water, as vapor, is expelled through the leaves.

The plant, being enclosed in a special chamber, means the vapors are unable to re-enter the general environment. The chamber is ported so as to direct the vapors to another chamber where the vapor is indirectly exposed to cooler air, and condenses, where it is collected and stored.

These chambers and ports can be discreet structures, or they can be integrated with, and congruent to, the glazing of the enclosure. Transpiration is enhanced by increasing the levels of certain nutrients which induce the plants into a state of luxurious transpiration. Transpiration occurs 24 hours a day and light augmentation devices integral to the structure maintain full plant metabolism regardless of weather conditions.

Figure 17:
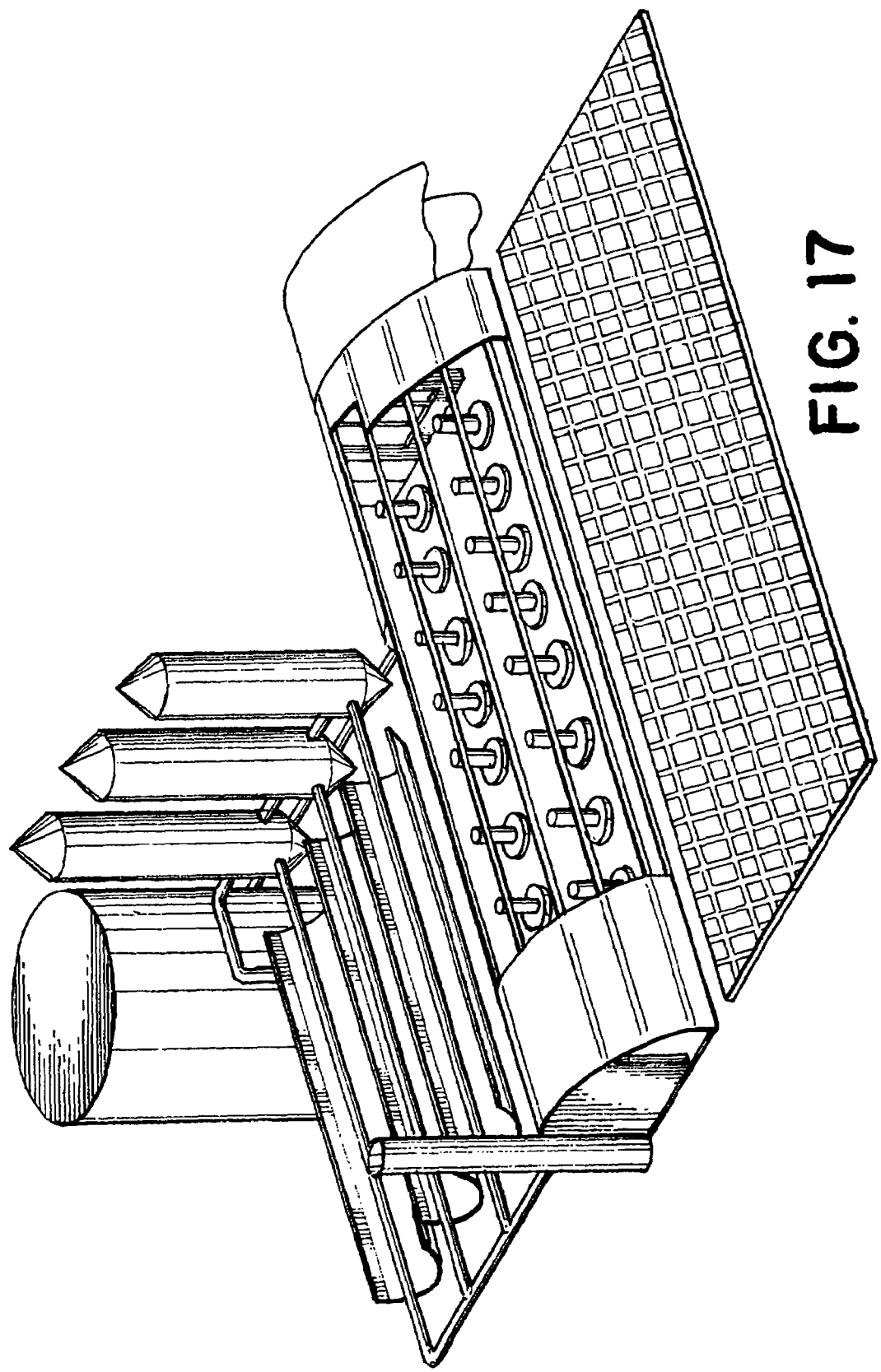
FIG. 17 is an isometric view of an algae conversion plant.

Turning to FIG. 17, It has long been known that algae could be converted into fuel, but the cost of the process has not been competitive with other methods. We have devised a new method that is very competitive with other synfuel processes and with petroleum based fuels.

The device consists of a translucent, closed tank where algae is grown under ideal conditions of light, air, temperature and nutrients. These inputs are produced via renewable energy sources such as wind turbines and photo-voltaic panels. These circulate air, collect water and provide supplemental light and heat. The systems are operated via an integrated series of sensors functioning as an analog logic circuit. These controls keep the biological processes functioning at their maximum rate and insulate the effects of weather and photoperiod. This can be constructed as either a stationary or mobile apparatus.

In tandem with this tank is a protein separator which continuously removes and dewaters the algae. The water is returned to the algae tank while the extracted algae is sent to one of four processes.

Process 1: The algae dried in a solar-thermal dryer and then ground up into a dry powder. This is a fuel with the same heating value by weight as coal, and burns cleanly. Process 1B: This material may also be pyrolized into methane.

Process 2: After being dewatered, the algae is placed in sealed vessel where it is mechanically emulsified and blended with yeast. The yeast ferments the carbohydrates in the cell membrane, releasing the oils inside and yielding CO2 and ethanol. The CO2 is directed back to the algae tank to enhance growth. The resulting liquid is now a melange of oils and ethanol. The melange can be burned directly in external combustion engines as a substitute for fuel oil, or it is directed into clear tube and subjected to intense sunlight from a concentrating solar collector. The resulting heat and pressure turns the melange into biodiesel. After filtering out what solids may remain, the fuel can be combusted in an ordinary diesel engine.

Process 3: After being dewatered, the algae is directed into a clear tube and subjected to intense sunlight from a concentrating solar collector. The heat and UV rays convert the carbohydrates and the internal lipids into sugars. These are then moved to a sealed vessel, yeast is added and the liquid is fermented into ethanol. The CO2 from fermentation is directed back to the algae tank to enhance growth. The ethanol is extracted via a low temperature distillation process. The remaining liquid is used as nutrients for the algae.

Process 4: After being dewatered, the algae is placed in a sealed pressure vessel. There it is heated via induction of an electrical current, or concentrated solar radiation to supercritical temperature. The vessel is lined with a catalyst. The super-critical fluid is held for a short period of time, less than a minute, and then released from the vessel. The sudden release of pressure causes the fluid to cool and condense into a petroleum-like hydrocarbon blend.

ZENOC is Zero Emissions, NO Carbon clean, dispatchable power without emissions.

Fervilithic is from the Latin meaning fervid=very hot, and lithos=stone. Very hot stone. In concept it is a very simple way to store energy. In practice it is nearly as simple. Advances in materials such as high temperature insulating materials, and machine intelligence, make a commercially practical solution for green energy production. We use concentrating solar collectors, wind turbines and algae biomass. These send heat to a mass of thermal storage media. This container is surrounded by insulation. The media is heated to around 900 degrees F. Once the entire thermal 'battery' is charged the heat goes to a poly-phasic engine.

This engine is a Rankine-cycle engine in which multiple chambers are connected in series via one-way, pressure relief valves. It is filled with a non-combustible fluid. When heat is applied to the exterior of the chambers a small portion of the fluid changes state to a gas, increasing in volume to many times that of the chamber. Driven by this expansion, the fluid exits the chamber at high pressure and velocity in both a liquid and gaseous state. This liquid/gas is directed into a turbine with blades configured to convert the liquid portion of the flow into kinetic energy via an impulse exchange, while simultaneously converting the velocity of the gaseous portion into pressure energy via a reaction exchange. As the turbine absorbs the kinetic energy of the fluid as work, the fluid cools and the gaseous portion returns to a liquid within the flow. Downstream of the engine the fluid enters the chambers where the phase change of the gaseous portion causes a reduction in volume. The one way valves prevent a flow reversal therefore the resulting change in volume causes a pressure drop and cooling. Residual pressure inside the engine returns the liquid to the chambers where the cycle starts again.

The heat from the thermal battery can also be directed into existing Joule-cycle generating plants, instantly converting them to green, zero-emission power plants. This can be done at a fraction of the cost of new wind or photo-voltaic power plants.

Once charged the system can generate power for days without further input of energy due to new super-insulating materials. It allows the best of both worlds. It efficiently stores renewable energy when it is available, for use when it is needed in whatever quantity that is needed. The heat storage medium is chemically inert, non-pressurized and non-combustible. It is the safest energy storage system available.

The invention claimed is:

1. A system for producing hydrocarbons from wind energy, water, and air comprising:
   a power system for producing, storing, and distributing power, the power system including:
   a wind turbine for harnessing the wind energy, the wind turbine having a rotatable shaft and one or more rotor blades connected to the rotatable shaft,
   an electrical generator mechanically coupled with the rotatable shaft for producing power when wind contacts the one or more rotor blades causing the rotatable shaft to rotate thereby producing power, and
   a power storage and regulation element, for regulating and storing the power produced by the generator;
   a water purifier, the water purifier including:
   a conduit comprising a first rim defining a first opening, and second rim defining a second opening, and at least one conduit wall extending from the first rim to an elevation that is higher than the phase change elevation of water to the second rim, thereby allowing water vapor to separate from the water and travel to the second opening of the conduit when a vacuum is applied to the conduit, and
   a vacuum device for applying a vacuum,
   wherein the first opening of the conduit is submerged in the water, the vacuum device is in communication with the second opening exerting a vacuum sufficient to reduce the pressure inside the conduit to the vapor pressure of the water thereby raising the water in the conduit to a phase change elevation where the water changes state from liquid to vapor, allowing the water vapor to be pulled through the vacuum pump and discharged a collection container, to collect condensate;

a hydrocarbon processor, the hydrocarbon processor including:

a carbon dioxide interface for introducing carbon dioxide to the hydrocarbon processor, an electrolyzer adapted to receive power produced by the generator, and further adapted to convert water, via electrolysis, into hydrogen and oxygen, and provide a hydrogen effluent stream of hydrogen, a reverse water gas shift (RWGS) reactor adapted to receive the hydrogen effluent stream from the electrolyzer and a carbon dioxide stream containing carbon dioxide for converting the carbon dioxide and hydrogen, in the presence of a catalyst, into a RWGS effluent stream comprising carbon monoxide and water, and an ethanation reactor adapted to receive and convert the RWGS effluent stream, in the presence of a catalyst, into the hydrocarbon product; and a control system for regulating and monitoring the power system and the hydrocarbon processor.

2. The system of claim 1, the vacuum device including a vacuum pump, the vacuum pump being either mechanically adapted to operate from the turning of the rotatable shaft in response to the wind contacting the one or more rotor blades, or the vacuum pump being equipped with an electric motor that operates from the power produced by the generator.

3. The system of claim 1, the vacuum device including a venturi duct and a fan, the venturi duct defined by an upstream opening defining a first cross sectional area at a first end, a downstream opening having a second cross sectional area at a second end, and one or more duct walls connecting the upstream opening to the downstream opening, said duct having a throat section defined by the one or more duct walls, located between the upstream opening and the downstream opening, and having a throat cross sectional area that is less than the first cross sectional area, and the venturi duct further being connected to the second opening of the conduit at a port located in the one or more duct walls at the throat section, whereby the fan directs airflow through the throat section of the duct, causing a drop in pressure and exerting a vacuum at the second opening of the conduit.

4. A system for producing hydrocarbons from wind energy, water, and algae comprising:

a power system for producing, storing, and distributing power, the power system including:

a wind turbine for harnessing the wind energy, the wind turbine having a rotatable shaft and one or more rotor blades connected to the rotatable shaft, an electrical generator mechanically coupled with the rotatable shaft for producing power when wind contacts the one or more rotor blades causing the rotatable shaft to rotate thereby producing power, and a power storage and regulation element, for regulating and storing the power produced by the generator;

a water purifier, the water purifier including:

a conduit, the conduit comprising a first rim defining a first opening, and second rim defining a second opening, and at least one conduit wall extending from the first rim to an elevation that is higher than the phase change elevation of water to the second rim, thereby allowing water vapor to separate from the water and travel to the second opening of the conduit when a vacuum is applied to the conduit, and a vacuum device for applying a vacuum, wherein the first opening of the conduit is submerged in the water, the vacuum device is in communication with the second opening exerting a vacuum sufficient to reduce the pressure inside the conduit to the vapor pressure of the water thereby raising the water in the conduit to a phase change elevation where the water changes state from liquid to vapor, allowing the water vapor to be pulled through the vacuum pump and discharged a collection container, to collect condensate water;

a hydrocarbon processor, the hydrocarbon processor including:

a cyanobacteria cultivator for cultivating a solution of cyanobacteria utilizing the condensate water, a solution optimizer for adjusting the amount of water in the solution of cyanobacteria and water to create an optimized solution of cyanobacteria and water, and a catalyzer for causing a portion of the optimized solution of cyanobacteria and water to reach a supercritical state, wherein a portion of the optimized solution is broken down into its elemental constituents creating a postsupercritical portion of the optimized solution; and a control system for regulating and monitoring the power system and the hydrocarbon processor.

5. The system of claim 4, the vacuum device including a vacuum pump, the vacuum pump being either mechanically adapted to operate from the turning of the rotatable shaft in response to the wind contacting the one or more rotor blades, or the vacuum pump being equipped with an electric motor that operates from the power produced by the generator.

6. The system of claim 4, the vacuum device including a venturi duct and a fan, the venturi duct defined by defined by an upstream opening defining a first cross sectional area at a first end, a downstream opening having a second cross sectional area at a second end, and one or more duct walls connecting the upstream opening to the downstream opening, said duct having a throat section defined by the one or more passageway walls, located between the upstream opening and the downstream opening, and having a throat cross sectional area that is less than the first cross sectional area, and the venturi duct further being connected to the second opening of the conduit at a port located in the one or more duct walls at the throat section, whereby the fan directs airflow through the throat section of the duct, causing a drop in pressure and exerting a vacuum at the second opening of the conduit.

7. The system of claim 5, wherein the catalyzer comprises a pressure vessel having electrodes disposed within the pressure vessel for applying an electrical current to the optimized solution.

8. The system of claim 6, wherein the catalyzer comprises a pressure vessel having electrodes disposed within the pressure vessel for applying an electrical current to the optimized solution.

9. The system of claim 5, wherein the catalyzer comprises a cavatition inducing nozzle, wherein the optimized solution is forced through said nozzle, causing a portion of the optimized solution to reach a supercritical state, wherein said portion of the optimized solution is reduced into its elemental constituents creating a postsupercritical portion of the optimized solution containing hydrocarbons after cooling and condensing.

10. The system of claim 6, wherein the catalyzer comprises a cavatition inducing nozzle, wherein the optimized solution is forced through said nozzle, causing a portion of the optimized solution to reach a supercritical state, wherein said portion of the optimized solution is reduced into its elemental constituents creating a postsupercritical portion of the optimized solution containing hydrocarbons after cooling and condensing.

11. A system for producing purified water from wind energy and water comprising:
a wind turbine for harnessing the wind energy, the wind turbine having a rotatable shaft and one or more rotor blades connected to the rotatable shaft,
a conduit, the conduit comprising a first rim defining a first opening, and second rim defining a second opening, and at least one conduit wall extending from the first rim to an elevation that is higher than the phase change elevation of water to the second rim, thereby allowing water vapor to separate from the water and travel to the second opening of the conduit when a vacuum is applied to the conduit, and
a vacuum device for applying a vacuum,
wherein the first opening of the conduit is submerged in the water, the vacuum device is in communication with the second opening exerting a vacuum sufficient to reduce the pressure inside the conduit to the vapor pressure of the water thereby raising the water in the conduit to a phase change elevation where the water changes state from liquid to vapor, allowing the water vapor to be pulled through the vacuum device and discharged into a collection container, to collect condensate water.

12. The system of claim 11, the vacuum device including a vacuum pump, the vacuum pump being either mechanically adapted to operate from the turning of the rotatable shaft in response to the wind contacting the one or more rotor blades, or the vacuum pump being equipped with an electric motor that operates from the power produced by the generator.

13. The system of claim 11, the vacuum device including a venturi duct and a fan, the venturi duct defined by defined by an upstream opening defining a first cross sectional area at a first end, a downstream opening having a second cross sectional area at a second end, and one or more duct walls connecting the upstream opening to the downstream opening,
said duct having a throat section defined by the one or more duct walls, located between the upstream opening and the downstream opening, and having a throat cross sectional area that is less than the first cross sectional area, and
the venturi duct further being connected to the second opening of the conduit at a port located in the one or more duct walls at the throat section, whereby the fan directs airflow through the throat section of the duct, causing a drop in pressure and exerting a vacuum at the second opening of the conduit.

14. A method for producing purified water comprising:
turning a wind turbine to effect generation of electricity in a generator;
transferring electricity produced by the generator to power one or more devices;
exerting a vacuum on a water source to extract water vapor;
condensing the water vapor; and
collecting the water vapor that condensed, wherein the step of exerting a vacuum on a water source to extract water vapor comprises
providing a conduit, the conduit comprising a first rim defining a first opening, and second rim defining a second opening, and at least one conduit wall extending from the first rim to an elevation that is higher than the phase change elevation of water to the second rim, thereby allowing water vapor to separate from the water and travel to the second opening of the conduit when a negative pressure is applied to the conduit,
submerging the first opening of the conduit in water,
connecting the second opening of the conduit to a vacuum pump, and
applying a negative pressure to the second opening of the conduit with the vacuum pump, thereby causing water from the water source to be drawn upwardly into the conduit to the phase change elevation, wherein the water vapor is separated from the water and pulled towards the second opening of the conduit.

15. A method for producing purified water comprising:
turning a wind turbine to effect generation of electricity in a generator;
transferring electricity produced by the generator to power one or more devices;
exerting a vacuum on a water source to extract water vapor;
condensing the water vapor; and
collecting the water vapor that condensed, wherein the step of exerting a vacuum on a water source to extract water vapor comprises
providing a duct defined by a upstream opening defining a first cross sectional area at a first end and a downstream opening having a second cross sectional area at a second end, and one or more duct walls connecting the upstream opening to the downstream opening, said duct having a throat section defined by the one or more duct walls, located between the upstream opening and the downstream opening, and having a throat cross sectional area that is less than the first cross sectional area,
providing a conduit, the conduit comprising a first rim defining a first opening, and second rim defining a second opening, and at least one conduit wall extending from the first rim to an elevation that is higher than the phase change elevation of water to the second rim, thereby allowing water vapor to separate from the water and travel to the second opening of the conduit when a negative pressure is applied to the conduit,
submerging the first opening of the conduit in water,
connecting the second opening of the conduit to a port located in the one or more duct walls at the throat section, and
forcing air through the duct, thereby exerting a vacuum on the second opening.

16. The method of claim 15, wherein the step of forcing air through the duct is accomplished by directing wind from a fan into the duct.

17. A method for producing hydrocarbons, comprising:
turning a wind turbine to effect generation of electricity in a generator,
transferring electricity produced by the generator to an electrolyzer to enable the electrolyzer,
exerting a vacuum on a water source to extract water vapor,
condensing the water vapor,
cultivating cyanobacteria in the water condensed form the water vapor to create a solution of cyanobacteria and water,
adjusting the amount of water in the solution to obtain an optimized solution of cyanobacteria and water,
catalyzing the optimized solution, causing a portion of the optimized solution to reach a supercritical state, wherein said portion of the optimized solution is broken down into its elemental constituents creating a postsupercritical portion of the optimized solution, allowing the optimized solution and the postsupercritical portion of the optimized solution to cool and condense, thereby forming a hydrocarbon product from the postsupercritical portion.

18. The method of claim 17, the step of catalyzing the optimized solution including applying an electrical current to the optimized solution, causing a portion of the optimized solution to reach a supercritical state, wherein said portion of the optimized solution is broken down into its elemental constituents creating a postsupercritical portion of the optimized solution.

19. The method of claim 17, the step of catalyzing the optimized solution including forcing the optimized solution through a cavitation inducing nozzle, causing a portion of the optimized solution to reach a supercritical state, wherein said portion of the optimized solution is broken down into its elemental constituents creating a postsupercritical portion of the optimized solution.

20. The system of claim 1, further including a heating element applied to the conduit to regulate the temperature of the water and/or the water vapor and to prevent icing in the conduit.

21. The system of claim 1, the vacuum pump being mechanically adapted to operate from the turning of the rotatable shaft in response to the wind contacting the one or more rotor blades.

22. The system of claim 1, further comprising a telemetric system for remote operation and monitoring of the system.

23. The system of claim 1, the system being integral to a floating vessel.

24. The system of claim 23, the floating vessel comprising:
one or more containers having a chamber formed therein, and
a structural frame for interconnecting the one or more chambers.

25. The system of claim 22, further comprising a navigation and propulsion system for permitting the system to traverse open waters.

26. The system of claim 25, the navigation and propulsion system being adapted to be remotely operated and monitored.

27. A floating vessel for producing water comprising:
one or more containers having one or more chambers formed therein, at least one of the one or more chambers being a root chamber for containing a root portion of a plant, and at least another of the one or more chambers being a transpiration chamber containing a non root containing portion of the plant,
a temperature and humidity controller for providing the root portion of the plant and/or the non root portion of the plant with an optimal environment for transpiring water vapor,
a nutrient controller for maintaining the optimal delivery of nutrients the root portion of the plant and/or the non root portion of the plant,
a lighting controller for maintaining optimal lighting within at least one of the one or more containers,
a power system for producing, storing, and distributing power, the power system including:
a wind turbine for harnessing the wind energy, the wind turbine having a rotatable shaft and one or more rotor blades connected to the rotatable shaft,
an electrical generator mechanically coupled with the rotatable shaft for producing power when wind contacts the one or more rotor blades causing the rotatable shaft to rotate thereby producing power, and
a power storage and regulation element, for regulating and storing the power produced by
the generator; and
a cooling container that is ported to the non root chamber, wherein the temperature and humidity controller, the nutrient water passes into the root chamber containing the root portion of the plant and the plant absorbs the water and transpires water vapor from the non root portion of the plant into the transpiration chamber where the water vapor passes into the cooling container and cools and condensate is collected.

28. The system of claim 11, further comprising a telemetric system for remote operation and monitoring of the system.

29. The system of claim 28, the system being integral to a floating vessel.

* * * * *